(12) United States Patent
Myers et al.

(10) Patent No.: US 8,208,239 B2
(45) Date of Patent: Jun. 26, 2012

(54) CONTACT METHOD TO ALLOW BENIGN FAILURE IN CERAMIC CAPACITOR HAVING SELF-CLEARING FEATURE

(75) Inventors: John D. Myers, Kokomo, IN (US); Ralph S. Taylor, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 393 days.

(21) Appl. No.: 12/469,087

(22) Filed: May 20, 2009

(65) Prior Publication Data

US 2010/0296223 A1 Nov. 25, 2010

(51) Int. Cl.
*H01G 2/00* (2006.01)
*H01G 4/015* (2006.01)

(52) U.S. Cl. ...................... 361/275.1; 361/273
(58) Field of Classification Search .................. 361/272, 361/275.1, 312, 313, 311, 273, 322
See application file for complete search history.

(56) References Cited

U.S. PATENT DOCUMENTS

| | | | | |
|---|---|---|---|---|
| 2,728,036 A * | 12/1955 | Ernst Steiner et al. | ....... | 361/273 |
| 3,491,433 A * | 1/1970 | Ohyachi et al. | ............... | 438/591 |
| 4,759,965 A | 7/1988 | Kato et al. | | |
| 4,814,946 A * | 3/1989 | Su | ................................. | 361/523 |
| 5,446,625 A * | 8/1995 | Urbish et al. | ................. | 361/761 |
| 7,099,141 B1 * | 8/2006 | Kaufman et al. | ............. | 361/311 |
| 2004/0195567 A1 * | 10/2004 | Ogino et al. | ..................... | 257/59 |
| 2005/0146840 A1 | 7/2005 | Lee et al. | | |

OTHER PUBLICATIONS

European Search Report dated Jul. 26, 2010.

\* cited by examiner

*Primary Examiner* — Timothy Thompson
*Assistant Examiner* — Roshn Varghese
(74) *Attorney, Agent, or Firm* — Lawrence D. Hazelton

(57) ABSTRACT

A capacitor exhibiting a benign failure mode has a first electrode layer, a first ceramic dielectric layer deposited on a surface of the first electrode, and a second electrode layer disposed on the ceramic dielectric layer, wherein selected areas of the ceramic dielectric layer have additional dielectric material of sufficient thickness to exhibit a higher dielectric breakdown voltage than the remaining majority of the dielectric layer. The added thickness of the dielectric layer in selected areas allows lead connections to be made at the selected areas of greater dielectric thickness while substantially eliminating a risk of dielectric breakdown and failure at the lead connections, whereby the benign failure mode is preserved.

20 Claims, 2 Drawing Sheets

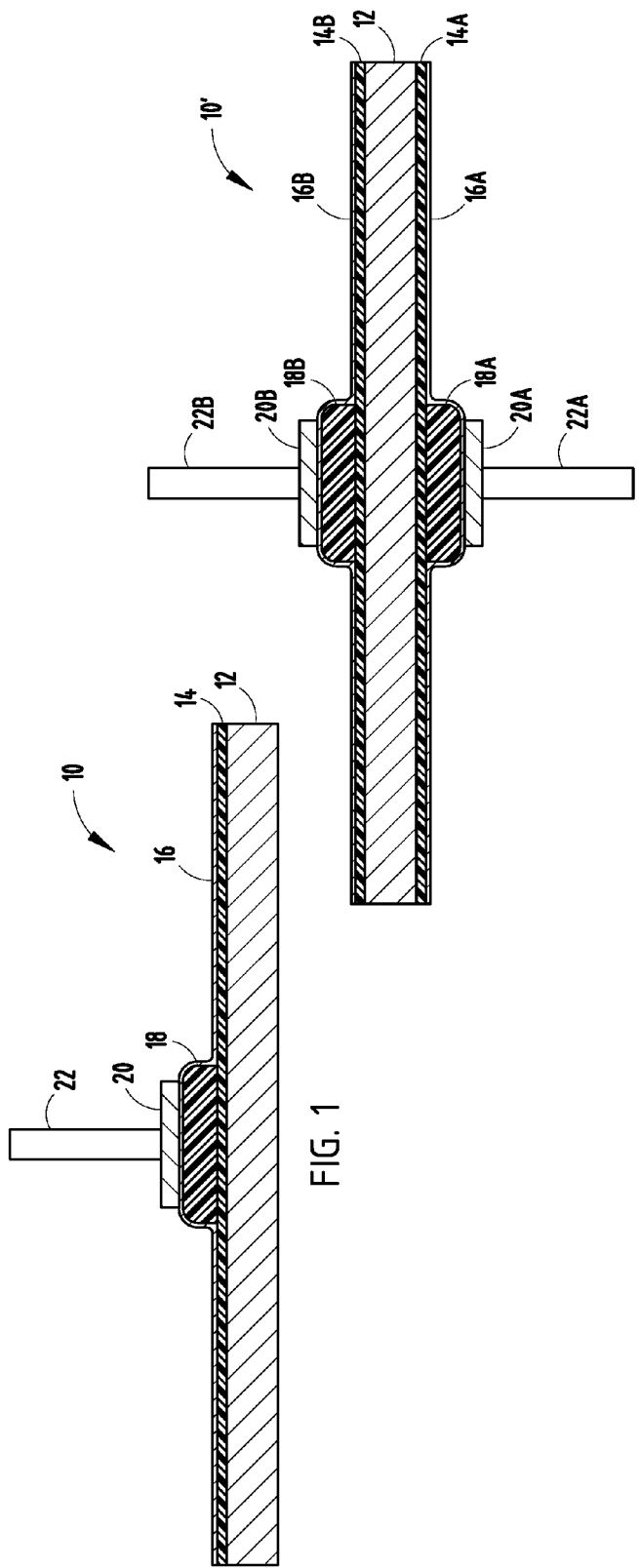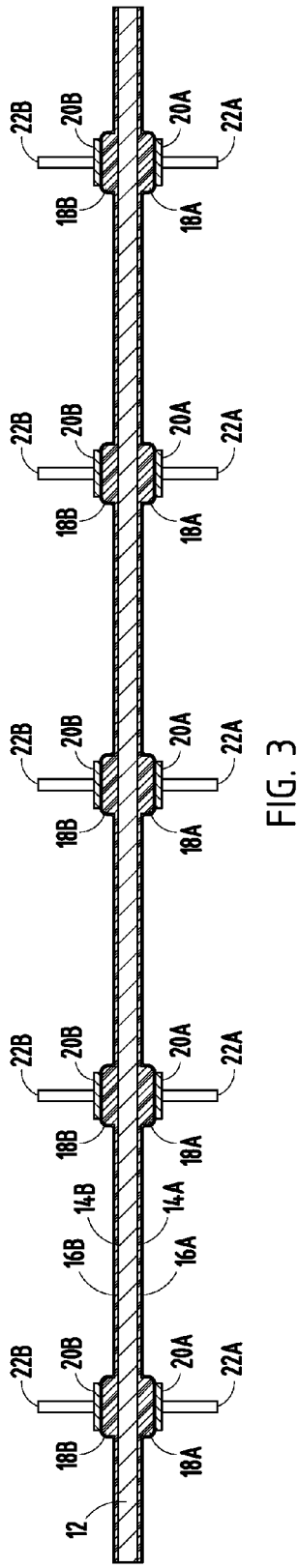

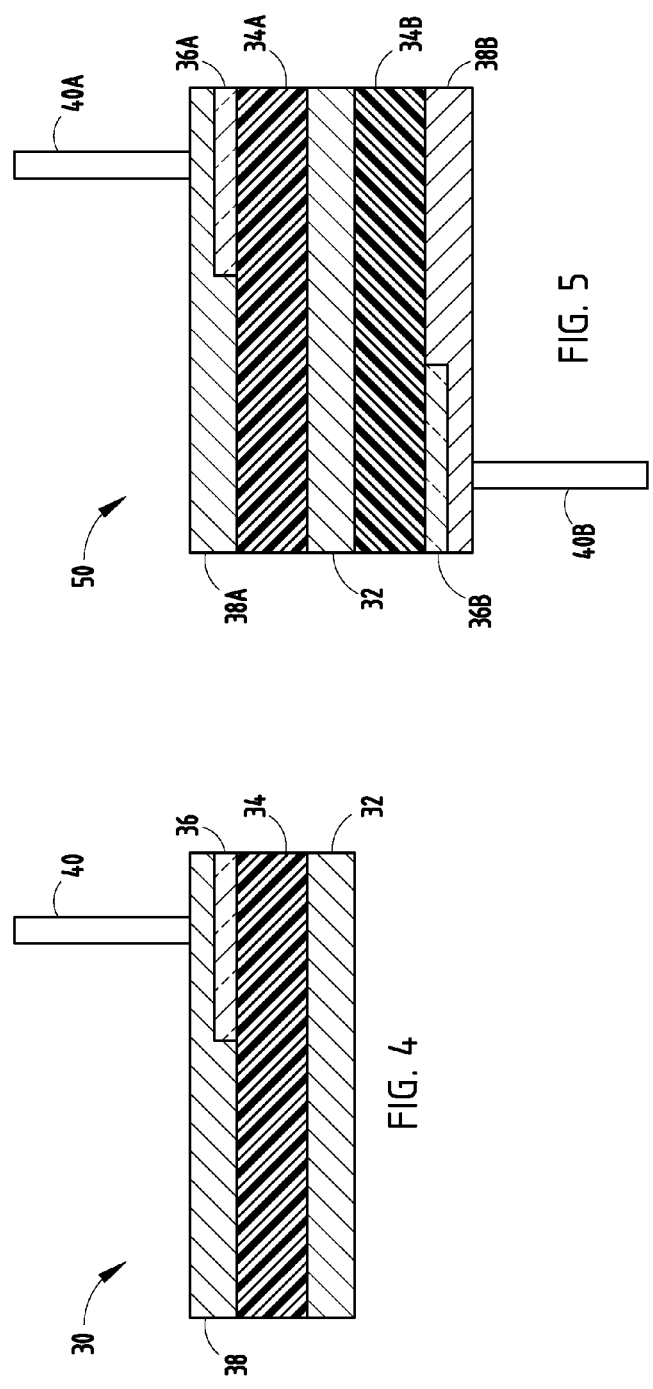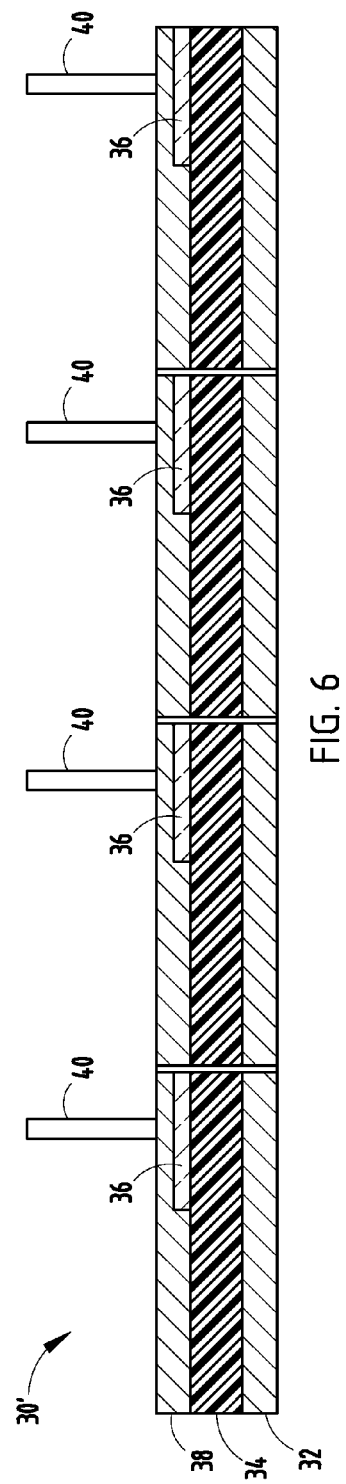

CONTACT METHOD TO ALLOW BENIGN FAILURE IN CERAMIC CAPACITOR HAVING SELF-CLEARING FEATURE

STATEMENT REGARDING FEDERALLY SPONSORED RESEARCH OR DEVELOPMENT

The subject invention was made under a CRADA Number 0700801 between Delphi Automotive Systems LLC and UChicago Argonne, LLC, as operator of Argonne National Laboratory for the United States Department of Energy. The United States government has certain rights in this invention.

FIELD OF THE INVENTION

This invention relates to capacitors and more particularly to attachment of electrical leads to ceramic capacitors exhibiting a benign failure mode.

BACKGROUND OF THE INVENTION

Ceramic capacitors exhibiting a benign or graceful failure mode in which a multitude (hundreds or even thousands) of discrete failure events lead toward a gradual loss of capacitance before the capacitor fails to perform acceptably are described in U.S. Pat. No. 7,099,141, which is hereby incorporated by reference in its entirety. This type of capacitor is comprised of a base electrode on which is deposited a relatively thin dielectric layer. Thereafter, a very thin top electrode is deposited on the ceramic layer. The thinness of the ceramic layer and the top electrode layer are important for providing high capacitance in a small volume capacitor. The thinness of the top electrode layer facilitates a benign or graceful failure characteristic. More specifically, the thinness of the top electrode allows the electrode to melt and vaporize when rapid highly localized temperature increase occurs during a defect failure, which, in turn, causes adjacent metal of the electrode to melt and vaporize. The thinness of the top electrode allows complete vaporization and loss of metal (i.e., "self-clearing") at the area of the failure. As a consequence, the failure is isolated to a very small area of the capacitor, and complete clearing of the electrode material at the area of failure prevents shorting that would result in complete or catastrophic failure. Accordingly, these ceramic capacitors may also be described as being short-resistant.

A problem with the thinness of the top electrode is that many contacts and/or leads may be necessary to safely carry current to and/or from the top electrode. Conventional lead connection techniques involve application of additional material (e.g., a contact pad) to the surface of the top electrode, effectively increasing the thickness of the metal at the area of the lead connection. This additional thickness of the metal prevents complete evaporation clearing of metal in the event of a failure at the lead connection, and, therefore, results in shorting, and a complete or catastrophic failure of the capacitor.

SUMMARY OF THE INVENTION

The invention overcomes or substantially reduces one or more problems identified above with respect to known ceramic capacitors exhibiting a benign failure mode. More specifically, the invention prevents dielectric breakdown across a ceramic dielectric layer in the vicinity of a lead connection of a short-resistant capacitor exhibiting a benign failure mode.

In certain aspects of the invention, a capacitor having a ceramic dielectric layer and at least one very thin electrically conductive layer adjacent the dielectric layer, which is sufficiently thin to exhibit a self-clearing benign failure mode, is provided with lead attachment areas in which the dielectric material is relatively thicker to substantially eliminate the possibility of dielectric breakdown in the vicinity of the lead connection.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1 is a schematic side-elevational view of a capacitor in accordance with a first embodiment of the invention.

FIG. 2 is a schematic elevational view of a first alternative embodiment of a capacitor in accordance with the invention.

FIG. 3 is a schematic illustration of a second alternative embodiment of a capacitor in accordance with the invention.

FIG. 4 is a schematic illustration of a third alternative embodiment in accordance with the invention.

FIG. 5 is a schematic illustration of a fourth alternative embodiment of the invention.

FIG. 6 is a schematic illustration of a fifth alternative embodiment of the invention.

DESCRIPTION OF THE PREFERRED EMBODIMENTS

In accordance with various aspects of the invention and as shown in FIG. 1., a capacitor 10 exhibiting a benign failure mode includes a first electrode layer 12, a ceramic dielectric layer 14 disposed on a surface of the first electrode layer, and a second electrode layer 16 disposed on the dielectric layer. A majority of the dielectric layer has a substantially uniform thickness and a substantially uniform capacitance per unit area. However, selected areas of the ceramic dielectric layer include additional dielectric material and exhibit a substantially lower capacitance than the majority of the dielectric layer.

The additional dielectric material 18 may be ceramic or non-ceramic material. When the additional dielectric material 18 is ceramic, it may either be the same ceramic material or a different ceramic material than is used for the ceramic dielectric layer disposed on a surface of the first electrode layer. For example, electrically insulative materials, such a metal oxides, may be deposited at selected areas of the ceramic dielectric layer to decrease capacitance in those areas, which may be used for electrical contacts or leads. The additional dielectric material (i.e., electrically insulative material) substantially increases dielectric breakdown voltage and substantially reduces capacitance in the selected areas, and may effectively render portions of the device inactive.

Because of this localized increased dielectric breakdown voltage and reduced capacitance, it becomes extremely unlikely that dielectric breakdown and/or failure can occur in those selected areas having additional dielectric material 18. Thus, the substantially uniform thickness and substantially uniform capacitance of the majority of the ceramic dielectric layer 14 ensures that any defect failures occur away from the selected areas having additional dielectric material 18. The second electrode layer 16 disposed on the dielectric layer is sufficiently thin to facilitate self-clearing of electrode material in the event of a failure, such that dielectric breakdown across the dielectric layer causes sufficient localized heating to completely melt, evaporate and eliminate metal from the second electrode layer immediately adjacent the locality of the failure, as is generally described in U.S. Pat. No. 7,099,141.

The term "short-resistant" refers to a capacitor that exhibits a benign failure mode, also known as graceful failure, in which a multitude of discrete failure events result in a gradual loss of capacitance. In many cases, the number of discrete failure events that must occur before an appreciable loss of capacitance is experienced may be on the order of hundreds or even thousands of events. In such case, each event is a localized event (on the order of about 20 micrometers in diameter) in which localized heating causes an adjacent portion of one or both of the electrodes to become vaporized, thereby physically clearing away electrode material from the defect site. In this mode of failure, shorts do not typically occur as a result of a defect failure. Rather, there is a gradual loss of capacitance and failure is delayed until a predetermined or defined leakage current or capacitance value is reached.

FIG. 1 shows a first embodiment of the invention in which an electrical lead is attached to a capacitor having a thin ceramic film layer, and which exhibits short-resistance and a benign failure mode. Illustrated capacitor 10 includes a base or first metal electrode layer 12, a substantially uniformly thick ceramic dielectric layer 14, and a top or second electrode layer 16, which is relatively thin to allow self-clearing in the event of a failure and dielectric breakdown across the dielectric layer. At a selected area, additional dielectric material 18 is provided. The additional dielectric material 18 may be the same or different from ceramic dielectric layer 14, with the thickness of material 18 and the properties and characteristics of material 18 being selected to significantly reduce or substantially eliminate any possibility of failure due to dielectric breakdown through material 18. In the case where the same ceramic material is used for layer 14 and additional material 18 (e.g., lead-lanthanum-zirconium-titanate) (PLZT), material 18 may have a thickness that is about 5 or more times the thickness of ceramic dielectric layer 14. Second, or top electrode layer 16 may be applied to a uniform thickness over the entire surface of the dielectric material, including dielectric layer 14 and added dielectric material 18. Metal contact pad 20 and electrical lead 22 are attached to second electrode layer 16 in the area of added material 18 to substantially eliminate the possibility of a dielectric breakdown discharging thru material 18 between electrode 12 and contact 20.

Base electrode 12 may generally be comprised of any suitable electrically conductive metal, and may have any thickness that is suitable or appropriate for the application and manufacturing technique employed for making the capacitor. Examples include nickel, copper, stainless steel and aluminium. However, other materials may be employed for bottom or first electrode layer 12.

Deposited on the first metal layer is a ceramic layer, such as a lead lanthanum zirconium titanate (PLZT) ceramic. Another example of a suitable ceramic material is barium titanate ($BaTiO_3$). Also, combinations of different ceramic materials may be used. Additionally, rather than directly depositing a ceramic such as PLZT on the rigid substrate or an oxide surface formed on the rigid substrate, a buffer layer be first applied to promote adhesion between the first metal layer and the PLZT or other ceramic layer. Use of a buffer layer prevents diffusion oxidation and promotes adhesion of the metal layer, and may perform a planarizing function. An example of a suitable buffer layer is a lanthanum nickel oxide (LNO) film, which may be applied to a thickness of, for example, from about 0.2 to about 0.3 micrometers. Another example of a suitable buffer layer that promotes adhesion between the ceramic layer and the first metal layer is an organic solderability preservative (OSP) coating. A suitable thickness for the ceramic layer (e.g., PLZT layer) is from about 2 to about 3 micrometers. This provides a suitable and desirable characteristic of high capacitance. However, slightly thinner and thicker ceramic layers can also provide adequate results. For example, thicknesses in the range of from about 0.1 to about 4 micrometers are expected to provide desirable results.

On selected areas of the surface of the ceramic layer, additional electrically insulated material can be applied to facilitate attachment of electrical leads to a subsequently applied second metal layer (electrode). By providing additional electrical insulation at those areas of the capacitor where electrical leads are to be attached, it becomes possible to connect electrical leads to the completed capacitor without compromising the benign failure mode characteristic and without compromising short resistance. The additional electrically insulative material at the lead attachment area prevents dielectric breakdown between the electrodes at the lead attachment area, thereby eliminating the possibility of a defect failure in the area of the electrical lead connection. This is important because a failure at a lead connection area would result in a short circuit and catastrophic failure of the capacitor since the lead connection would prevent vaporization and self-clearing of electrode material at the lead connection. Suitable techniques for patterning an insulative oxide layer or spin-on glass (SOG) layer are well known in the art and do not, by themselves, constitute the invention.

A second metal layer 16 is deposited on the ceramic layer 14 and over any patterned insulative material deposited on the ceramic layer to facilitate connection of electrical leads. The first 12 and second 16 metal layers separated by the ceramic layer 14 define a capacitor having a high capacitance per unit area. The second metal film is preferably deposited to a thickness in the range of from about 0.01 to about 0.1 micrometers (i.e., about 10 nanometers to about 100 nanometers). Such extremely thin second electrode allows complete evaporation or self-clearing of a very small area of the electrode in the event of a failure, whereby the capacitance of the entire capacitor is only very slightly reduced. As a result, numerous (e.g., hundreds or thousands) discrete failure events may occur before the capacitor is unable to perform satisfactorily.

Deposition of the second metal layer 16 may be accomplished by any means which provides layers of uniform thicknesses, and generally includes sputtering, thermal evaporation, electron beam evaporation, chemical vapour deposition, and physical vapour deposition. The second metal layer 16 may be comprised of generally any metal that can be deposited on the ceramic layer, which is substantially inert, highly electrically conductive, and has a sufficiently low vaporization temperature. Examples of suitable metals include aluminum, platinum, copper, zinc, silver, gold, and combinations thereof. For example, a suitable second metal layer may be deposited using electron beam evaporation technique to deposit aluminium to a thickness of about 0.2 to 0.3 micrometers.

The added material 18 may be comprised of additional ceramic material identical to the ceramic material of layer 14, or may be comprised of a different ceramic material or another insulative material, such as a metal oxide material. Material 18 may be deposited using any suitable technique, such as physical or chemical vapour deposition.

Conventional technology may be employed for attaching contact pad 20 and electrical lead 22 to capacitor 10.

In an alternative embodiment shown in FIG. 2, electrical contacts may be connected on opposite sides of a three plate capacitor having a central or base metal electrode layer 12, ceramic dielectric layers 14A and 14B disposed on opposite surfaces of layer 12, added dielectric material 18A and 18B at selected areas on surfaces of layers 14A and 14B, and outer electrode layers disposed over the dielectric layers 16A and 16B and additional dielectric material 18A and 18B. Contact pads 20A and 20B, and leads 22A and 22B may be attached on opposite sides of capacitor 10'. The three plate capacitor design of FIG. 2 allows higher capacitance to be achieved in a more compact arrangement.

As will be understood by reference to FIG. 3, FIGS. 1 and 2 are merely illustrative of the concepts of the invention, it being understood that a plurality or multiplicity of contacts or leads may be attached to the capacitors of this invention, such as illustrated in FIG. 3.

FIG. 4 shows an alternative technique for making a capacitor in accordance with the invention, which has relatively thick dielectric areas that prevent dielectric breakdown in those areas and allow attachment of electrical leads 40 to a capacitor 30 exhibiting a benign failure mode. As shown in FIG. 4, the alternative device 30 includes a first electrode layer 32 (e.g., nickel or copper foil) a ceramic dielectric layer (e.g., PLZT), a layer 36 of additional dielectric material at selected areas of the ceramic dielectric layer 34, and a second metal electrode layer 38 deposited over exposed surfaces of dielectric layers 34 and 36. An electrical lead 40 may then be attached to metal layer 38. As with the previous embodiments, the additional thickness of dielectric material 36 at selected areas of the device 30 prevents dielectric breakdown across added material 36 thereby confining such dielectric breakdown and subsequent failures to the thinner and/or less resistant areas of dielectric material between electrodes 32 and 38. Additional material 36 can be an oxide layer.

In another alternative embodiment shown in FIG. 5, a three plate capacitor design is utilized having a central base or a first electrode 32, dielectric layers 34A and 34B deposited on opposite faces of layer 32, additional dielectric material 36A and 36B deposited on selected surfaces of layers 34A and 34B respectively, and second electrode layers 38A and 38B deposited on dielectric materials 34A and 36A and 34B and 36B respectively. Electrodes 40A and 40B are connected to metal electrode layers 38A and 38B respectively at opposite sides or faces of the capacitor 50.

As will be understood by reference to FIG. 6, FIG. 4 and FIG. 5 are merely illustrative of the invention, it being understood that an actual device in accordance with the invention may incorporate a plurality of leads 40 connected to a capacitor 30' in accordance with the invention.

With the invention, many contacts can be applied over the surface of a capacitor without jeopardizing the benign failure feature of the capacitor. With the invention, benign failure can only occur where the electrical plate is very thin. Thus, the added dielectric thickness in selected areas in accordance with the invention guarantees that no shorts will occur under the contact area. Due to the thinness of the plate material many contacts are envisioned to provide ideal electrical properties, including low ESR, high ripple current and low inductance.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A capacitor exhibiting a benign failure mode, comprising:
    a first electrode layer;
    a first dielectric layer disposed on a surface of the first electrode layer;
    a second dielectric layer overlaying a portion of the first dielectric layer, said second dielectric layer exhibiting a higher dielectric breakdown voltage than the first dielectric layer;
    a second electrode layer disposed over the first dielectric layer and the second dielectric layer, the second electrode layer being sufficiently thin to facilitate self-clearing of electrode material in the event of a failure; and
    a first contact pad in electrical contact with the second electrode layer and overlaying only the portion of the first dielectric layer covered by the second dielectric layer.

2. The capacitor of claim 1, in which the first dielectric layer is comprised of PLZT.

3. The capacitor of claim 1, further comprising a buffer layer between the first electrode layer and the first dielectric layer, wherein the buffer layer is of a material selected from lanthanum nickel oxide (LNO) and organic solderable preservative (OSP).

4. The capacitor of claim 1, in which the first electrode layer is of a material selected from the group consisting of nickel, copper, stainless steel and aluminum.

5. The capacitor of claim 1, in which the first dielectric layer is comprised of barium titanate.

6. The capacitor of claim 1, in which the first dielectric layer has a thickness of from 0.1 to 4 micrometers.

7. The capacitor of claim 1, in which the second dielectric layer is an insulative oxide or glass material.

8. The capacitor of claim 1, in which the second electrode layer has a thickness of about 0.01 to 0.1 micrometers.

9. The capacitor of claim 1, in which the second electrode layer is comprised of a material selected from aluminum, platinum, copper, zinc, silver, gold and combinations of these materials.

10. The capacitor of claim 1, further comprising a first electrical lead connected to the first contact pad.

11. The capacitor of claim 1, further comprising a third dielectric layer disposed on a surface of the first electrode opposite the side on which the first dielectric layer is disposed;
    a fourth dielectric layer overlaying a portion of the third dielectric layer, said fourth dielectric layer exhibiting a higher dielectric breakdown voltage than the third dielectric layer;
    a third electrode layer disposed over the third dielectric layer and the fourth dielectric layer, the third electrode layer being sufficiently thin to facilitate self-clearing of the third electrode in the event of a failure; and
    a second contact pad in electrical contact with the third electrode layer and overlaying only the portion of the third dielectric layer covered by the fourth dielectric layer.

12. The capacitor of claim 11, further comprising a buffer layer between the third electrode layer and the third dielectric layer, wherein the buffer layer is of a material selected from lead lanthium zirconium titante (PLZT) or OSP.

13. The capacitor of claim 11, in which the third dielectric layer is comprised of PLZT.

14. The capacitor of claim 11, in which the third dielectric layer is comprised of barium titanate.

15. The capacitor of claim 11, in which the third dielectric layer has a thickness of from 0.1 to 4 micrometers.

16. The capacitor of claim 11, in which the fourth dielectric layer is an insulative oxide or glass material.

17. The capacitor of claim 11, in which the third electrode layer has a thickness of from 0.01 to 0.1 micrometers.

18. The capacitor of claim 11, in which the third electrode layer is comprised of a material selected from aluminum, platinum, copper, zinc, silver, gold and combinations of these materials.

19. The capacitor of claim 11, in which the third electrode layer is aluminum having a thickness of from 0.2 to 0.3 micrometers.

20. The capacitor of claim 11, further comprising a first electrical lead connected to the first contact pad; and
a second electrical lead connected to the second contact pad.

* * * * *